June 27, 1950  N. E. ANDERSON  2,512,707
GAS-SHIELDED ARC WELDING TORCH
Filed Aug. 10, 1948  2 Sheets-Sheet 2

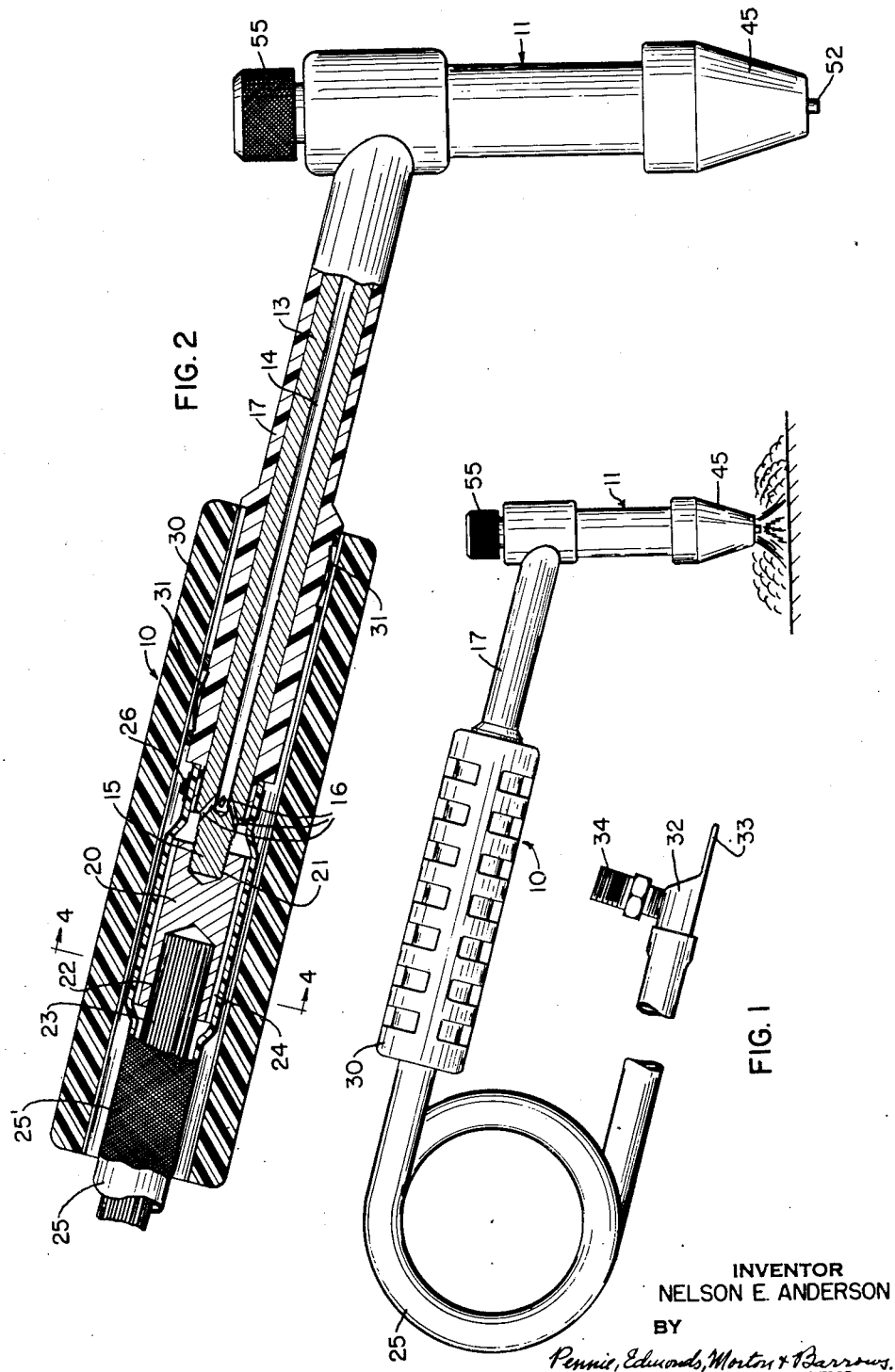

INVENTOR
NELSON E. ANDERSON
BY
Pennie Edmonds, Morton & Barrows.
ATTORNEYS

Patented June 27, 1950

2,512,707

UNITED STATES PATENT OFFICE 2,512,707

GAS-SHIELDED ARC WELDING TORCH

Nelson E. Anderson, Scotch Plains, N. J., assignor to Air Reduction Company, Incorporated, a corporation of New York Application August 10, 1948, Serial No. 43,365

8 Claims. (Cl. 219—15)

This invention relates to inert gas shielded arc welding, and more particularly to an improved electrode holder for use in the inert gas shielded arc welding field.

As is well known in the arc welding art, the inert gas shielded arc welding process is one in which an arc is struck between the work-piece and an electrode to produce the necessary welding heat, and an envelope of inert gas, usually helium or argon, is maintained around the arc and the weld puddle to prevent oxidation. The electrode is usually of the non-consuming or non-depositing type such as a tungsten electrode.

My copending application Serial No. 15,520, field March 18, 1948, discloses and claims a manual water-cooled electrode holder adapted for use in the inert gas shielded arc welding process. It was designed primarily for use in welding operations in which the electrode holder is called upon to carry high welding currents and therefore it is water-cooled and has other features that adapt it for welding operations of that type.

The principal object of this invention is to fulfill the need for a somewhat simpler and less expensive type of electrode holder adapted for use in manual inert gas shielded welding operations and that answers the purpose for welding operations of this kind where the use of relatively high welding currents is not required, or required for only short periods. According to the invention the electrode holder is so constructed that it is relatively small and light in weight and has a lead cable that is light and flexible and easy to manipulate, these things being made possible by special features of construction hereinafter described and by the fact that the electrode holder is air-cooled, as distinguished from the water-cooling of the electrode holder disclosed in the above-mentioned copending application.

An electrode holder embodying the invention is illustrated in the accompanying drawings, in which:

Figure 1 is a side elevation of the electrode holder and its lead cable;

Fig. 2 is an enlarged view of the electrode holder shown in Fig. 1, most of the handle portion being shown in vertical section;

Figures 3, 4, 5:
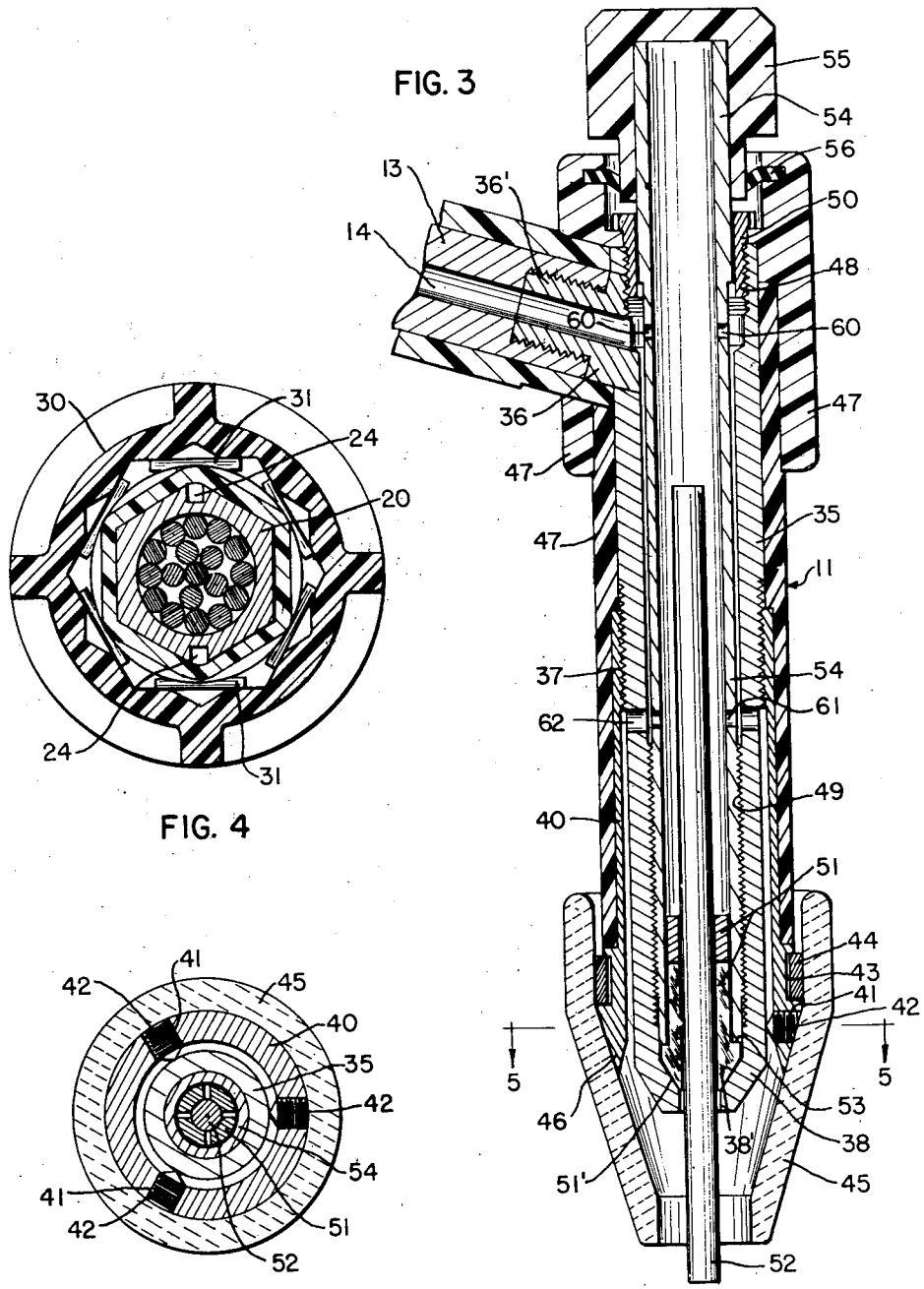
Fig. 3 is a vertical section of the barrel portion of the electrode holder drawn to a still larger scale.
Fig. 4 is a transverse section taken along the line 4—4 of Fig. 2.
Fig. 5 is a transverse section taken along the line 5—5 of Fig. 3.

Referring first to Figs. 1 and 2, the electrode holder comprises two main parts, a handle portion 10 and a barrel portion or body portion 11. The handle portion 10, in addition to serving as a handle conducts the shielding gas and welding current to the barrel and assists in dissipating heat from the barrel. In order to do this the handle is formed as follows. A piece of round copper stock is drilled to form a heavy walled tube 13 having an interior longitudinal passage 14. The passage 14 is countersunk and tapped at the barrel end for connection with the barrel, but it is not drilled completely through the rear end of the stock. This end is turned down and threaded to form a nipple 15. Four ports 16 are drilled from the base of the nipple into passage 14. An outer covering 17 of heat resistant non-conducting material, such as one of the glass silicone resins, covers the copper tube as shown. A metal connecting block 20 of hexagonal cross-section has an axial tapped hole 21 in one end adapted to receive the end of the nipple 15. Another axial hole 22 is drilled in the opposite end of the connecting block 20 to receive the end of a stranded copper conductor 23. Two slots 24 are milled in the hexagonal block 20 to act as gas ports (see also Fig. 4).

The lead cable for the electrode holder comprises the flexible stranded copper cable 23 and a surrounding loosely fitting non-conducting outer hose or sheath 25. Any flexible non-conducting material is satisfactory for the hose, such as rubber or a plastic. This may be covered with a heat resistant braid 25′ such as fibre glass impregnated with silicone resin. The hose is sufficiently large in diameter to allow passage of the shielding gas between the inner wall of the hose and the copper cable. The copper wires of the cable are metallically bonded to the inner surface of hole 22 in the connecting block 20. The outer hose 25 is drawn over the hexagonal connecting block 20 and over the end of the insulating material 17 surrounding the copper tube 13. A hose clamp 26 secures the end of the hose onto the insulating material 17. The shielding gas which enters the handle via the hose passes through the slots 24 in block 20 whose tops are spanned or covered by the hose 25. A tubular handle 30 having a waffle design on the outside and a central opening which in cross-section is shaped like a multi-point star is spring-clamped over the entire assembly as shown. The details of the handle and the specific spring means employed for clamping it over the other parts do not constitute part of the invention so it is sufficient to note that the handle is made of a non-conducting material and the spring clamps 31 make contact with the insulating material 17 and the handle itself over a very limited area, thereby keeping the heat transfer to the handle at a minimum.

The lead cable terminates in a fitting 32 (Fig. 1) having a lug 33 for attachment to the source of welding current and a pipe fitting 34 for attachment to a source of shielding gas such as helium or argon. From this it is evident that the welding current picked up by lug 33 passes through the stranded cable 23, connecting block 20, and tube 13 to the electrode holder barrel 11. Similarly, the shielding gas passes from fitting 32 through hose 25, connecting block slots 24, and ports 16 and passage 14 in tube 13 to the barrel.

The base member in the barrel 11 is a tubular copper piece 35 (Fig. 3) into which a fitting 36 is brazed that serves to connect the barrel with the handle portion. This fitting has a threaded nipple 36' adapted to engage in the tapped recess in the end of tube 13. The tubular member 35 has exterior threads 37 about midway of its length. Below the threads the diameter of the tubular member is reduced slightly. At its lower end the tubular member 35 is tapered to form a conical portion 38. A sleeve 40 fits over the lower portion of tubular member 35 and is internally threaded to engage threads 37. Three tapped holes 41 (see also Fig. 5) near the lower end of this sleeve receive set screws 42 which are used to center the sleeve about the lower portion of tubular member 35. An annular recess 43 in sleeve 40 holds a split ring 44 of resilient material over which a refractory gas cap or nozzle 45 is slipped. This gas cap may be made of any non-conducting refractory material, a preferred material being silicon carbide. The tendency for ring 44 to expand provides sufficient frictional force to hold the gas cap in place. The gas cap is cylindro-conical in shape and seats on a conical surface 46 at the lower end of sleeve 40. Tubular member 35, sleeve 40, and connecting fitting 36 are all adequately covered by insulating material 47. The tubular member 35 is internally threaded at its upper end as shown at 48, and also near its lower end as shown at 49. A bushing 50 screws into the upper end of tubular member 35, engaging the threads 48.

A collet 51, cylindrical in cross-section, has four slots extending partially through its length to form four jaws which can be clamped against the electrode. It has an external conical surface 51' at its lower end which has approximately the same angle as the interior taper 38' of the conical lower end 38 of tubular member 35, into which it is positioned. The interior diameter of the collet is slightly larger than the electrode 52. An annular shoulder 53 is formed on the outside of the collet just above its tapered lower end.

An inner tubular member 54 constituting a collet-jaw actuating member is externally threaded at its lower end and fits down inside tubular member 35. Its external threads engage the internal threads 49 at the lower end of tubular member 35. The bushing 50 holds the upper portion of tubular member 54 concentric within the barrel. The lower end of tubular member 54 bears against the shoulder 53 on the collet when the member 54 is screwed down sufficiently far. A knob 55 of insulating material is secured to the protruding upper end of the inner tubular member 54 to act as a handle. A rubber ring 56 acts as a gas seal between the knob and the body.

The electrode 52 is inserted in the holder from the bottom and slipped up into the collet to the desired height. The inner tubular member 54 is then screwed down by turning knob 55 to bring pressure to bear on shoulder 53 of collet 51. This forces the collet down and presses the conical surface at its lower end against the interior tapered surface of the conical portion 38 at the lower end of tubular member 35. This squeezes the jaws of the collet closed on the electrode to clamp it securely.

The shielding gas, which enters the barrel from passage 14 in the handle, passes down the annular passage between tubular members 35 and 54. Ports 60 are provided in the wall of inner tubular member 54 at substantially the level at which the gas passage 14 in the handle meets the barrel, through which the shielding gas also enters the interior of the tubular member 54. Exit ports 61 are provided farther down in the wall of tubular member 54 opposite gas ports 62 provided in tubular member 35. The ports 60 and 61 allow the shielding gas to drive out air trapped inside inner tubular member 54, thus preventing oxidation of the electrode when it gets hot. Ports 62 allow the gas to pass out of tubular member 35 into the annular space between member 35 and sleeve 40. From here the gas feeds directly into the gas cap or nozzle which discharges it in the form of a curtain around the tip end of the electrode. The gas thereby by-passes the collet. The welding current path is from copper tube 13 to fitting 36, to tubular member 35, to collet 51, to the electrode 52.

The heat picked up by the electrode holder from the welding arc is conducted back by all the metal parts and dissipated in the air and the shielding gas. A lot of the heat is carried back along the welding current conductors to the cable where it is ultimately dissipated in the air.

While the electrode holder herein described cannot carry the high welding currents for extended periods that the water cooled holder disclosed in the above-mentioned copending application can, it is extremely satisfactory for a large number of welding operations. It is small, light in weight, and has a light flexible cable for easy manipulation. Electrode adjustment and replacement is very quick and simple, requiring only a twist of knob 55. The same electrode holder will accommodate electrodes of various diameters by replacing the collet with one of appropriate size.

I claim:

1. An electrode holder comprising a barrel portion including an outer tubular member having an inwardly and downwardly tapering interior surface near its lower end, a collet located interiorly of said outer tubular member and capable of axial movement relative thereto, said collet having an axial opening to receive the electrode and having resilient electrode-gripping jaws and also having a conical surface formed on the collet jaws adapted to engage said tapering interior surface on said outer tubular member, an inner tubular member having threaded engagement with the outer tubular member at the tip end of the barrel portion so that when rotated it will move axially relative to the outer tubular member, the collet being provided with an external shoulder on the collet jaws adjacent the upper part of the conical surface thereof and the lower end of said inner tubular member extending downwardly over and around the upper portion of the collet and into engagement with said shoulder, and a knob located at the upper end of the barrel portion and connected to the upper end of said inner tubular member whereby the inner tubular member can be rotated to move it and the collet axially and thereby cause said conical surface on the collet to co-act with said tapered surface on the inner tubular member to force the collet jaws inwardly into clamping engagement with the electrode.

2. An electrode holder comprising a barrel portion, an axially movable collet mounted in the lower part of the barrel portion, said collet having an axial opening to receive the electrode and having resilient electrode-gripping jaws and also having a conical surface formed on the collet jaws, a part of the barrel portion having a tapering interior surface adapted to be engaged by said conical surface on the collet, a tubular member extending substantially throughout the length of the barrel portion and having threaded engagement with the lower part thereof whereby rotation of said tubular member produces axial movement of it, the collet being provided with an external shoulder on the collet jaws adjacent the upper part of the conical surface thereof and the lower end of said tubular member extending downwardly over and around the upper portion of the collet and into engagement with said shoulder, and a knob located at the upper end of the barrel portion and connected to the upper end of said tubular member whereby the tubular member can be rotated to move it and the collet axially and thereby cause said conical surface on the collet to co-act with said tapered surface on a part of the barrel portion to force the collet jaws inwardly into clamping engagement with the electrode.

3. An electrode holder having a body portion comprising a tubular member, electrode-gripping means in the lower portion of the tubular member, a sleeve coaxially surrounding the lower portion of the tubular member and connected at its upper end to the tubular member, the inner surface of the sleeve being spaced radially from the outer surface of the tubular member to form an annular gas conducting space, a gas nozzle supported at the lower end of said sleeve with its interior in communication with said annular gas conducting space, and means for delivering a shielding gas to the interior of said tubular member, the tubular member having at least one gas port extending transversely through its wall through which the shielding gas may pass from the interior of the tubular member to said annular gas conducting space between the tubular member and the sleeve.

4. An electrode holder in accordance with claim 3 in which the lower end of said sleeve is provided with a number of set screws extending transversely through its wall and bearing at their inner ends on the outer surface of said tubular member to maintain the radial spacing between the lower end of the sleeve and the lower end of the tubular member.

5. An electrode holder comprising a barrel portion and a handle portion disposed at an angle to each other, the handle portion having a gas-conducting passage through which a shielding gas may be delivered to the barrel portion, the barrel portion comprising an outer tube, a collet in the lower portion of said outer tube having an axial opening to receive the electrode and having resilient electrode-gripping jaws, an inner collet-jaw actuating tube within the outer tube and having threaded engagement at its lower portion with the interior of the outer tube and into the interior of which may project the upper portion of an electrode gripped by the collet, manually operable means located at the upper end of the barrel portion and connected to said inner collet-jaw actuating tube for rotating the same, a sleeve coaxially surrounding the lower portion of said outer tube and connected at its upper end to the outer tube, the inner surface of the sleeve being spaced radially from the outer surface of the outer tube to form an annular gas conducting space, a gas nozzle supported at the lower end of said sleeve with its interior in communication with said annular gas conducting space, the outer tube having a gas port extending transversely through its wall through which the shielding gas may pass to said annular gas conducting space between the outer tube and the sleeve, and said inner collet-jaw actuating tube having two gas ports extending transversely through its wall one adjacent the barrel end of the gas conducting passage in the handle portion and the other adjacent said port in the wall of the outer tube whereby the shielding gas on its way to the gas nozzle from the gas passage in the handle portion may pass through the interior of said collet-jaw actuating tube and into contact with the portion of the electrode which projects into it.

6. An electrode holder comprising a barrel portion which is electrically conductive, a handle portion disposed at an angle to the barrel portion, electrode-gripping means in the barrel portion near the lower end thereof, a gas nozzle at the lower end of the barrel portion in coaxial relation with an electrode when one is held by the gripping means, the barrel portion having means forming a gas passage for conducting gas to the interior of said nozzle for discharge around the tip of the electrode, a metal tube forming part of the handle portion and which is electrically connected with the barrel portion, the interior of said tube constituting a gas passage which leads to the barrel portion and which is in communication with the gas passage therein, said tube having a solid rear end portion, a lead cable comprising an electric conductor enclosed in a gas-conducting sheath, a metal block electrically connecting said conductor in the cable to the solid rear end of said tube, the sheath of the cable extending forwardly over and enclosing said block, means clamping the forward end of the cable sheath around said tube at a region forward of its solid rear end, said metal block being of larger diameter than the solid rear end of said tube whereby a gas chamber is formed under the cable sheath at the forward end of said block, at least one gas passage formed in said block extending from one end thereof to the other, and at least one transversely extending port in said tube placing said gas chamber in communication with the gas passage in the tube.

7. An electrode holder in accordance with claim 6 in which the gas passage in said block is formed by a groove extending lengthwise along the periphery of the block and covered by the portion of the cable sheath which encloses the block.

8. An electrode holder comprising a barrel portion, an axially movable collet mounted in the lower part of the barrel portion, said collet having an axial opening to receive the electrode and having resilient electrode-gripping jaws and also having a conical surface formed on the collet jaws, a part of the barrel portion having a tapering interior surface adapted to be engaged by said conical surface of the collet, a gas nozzle at the lower end of the barrel portion in coaxial relation with the electrode, the barrel portion having means forming a gas passage by-passing the collet for conducting gas to the interior of said nozzle for discharge around the tip of the electrode, a tubular member extending substantially throughout the length of the barrel portion and having threaded engagement with the lower part thereof whereby rotation of said tubular member produces axial movement of the tubular member, the collet being provided with an external shoulder on the collet jaws adjacent the upper part of the conical surface thereof and the lower end of said tubular member extending downwardly over and around the upper portion of the collet and into engagement with said shoulder, and a knob located at the upper end of the barrel portion and connected to the upper end of said tubular member whereby the tubular member can be rotated to move it and the collet axially and thereby cause said conical surface of the collet to co-act with said tapered surface on a part of the barrel portion to force the collet jaws inwardly into clamping engagement with the electrode.

NELSON E. ANDERSON.

REFERENCES CITED

The following references are of record in the file of this patent:

UNITED STATES PATENTS

| Number | Name | Date |
|---|---|---|
| 1,438,497 | Jones | Dec. 12, 1922 |
| 2,014,226 | Catlett | Sept. 10, 1935 |
| 2,357,844 | Nellis | Sept. 12, 1944 |
| 2,376,265 | Meredith | May 15, 1945 |
| 2,395,228 | Lininger | Feb. 19, 1946 |
| 2,444,767 | Cobean | July 6, 1948 |
| 2,468,805 | Herbst | May 3, 1949 |

FOREIGN PATENTS

| Number | Country | Date |
|---|---|---|
| 394,950 | Great Britain | Sept. 29, 1931 |